US005209509A

United States Patent [19]

Gay et al.

[11] Patent Number: 5,209,509

[45] Date of Patent: May 11, 1993

[54] WHEELCHAIR FOOTREST ASSEMBLY

[75] Inventors: Dwight S. Gay, Fenton; John W. Hoornstra, Vassar, both of Mich.

[73] Assignee: Gunnell, Inc., Millington, Mich.

[21] Appl. No.: 528,152

[22] Filed: May 26, 1990

[51] Int. Cl.[5] .............. B62K 15/00

[52] U.S. Cl. .............. 280/304.1; 280/288.4; 280/250.1; 297/DIG. 4; 297/431

[58] Field of Search .............. 280/304.1, 250.1, 288.4, 280/287, 647, 657, 291; 297/431, 433, 435, DIG. 4

[56] References Cited

U.S. PATENT DOCUMENTS

| | | | |
|---|---|---|---|
| 2,826,242 | 3/1958 | Thompson | 297/DIG. 4 X |
| 3,185,495 | 5/1965 | Pivacek | 280/657 |
| 3,761,129 | 9/1973 | Schultz | 297/DIG. 4 X |
| 3,854,774 | 12/1974 | Limpach | 297/433 X |
| 4,354,791 | 10/1982 | Antonellis | 297/DIG. 4 X |
| 4,415,202 | 11/1983 | Pew | 297/DIG. 4 X |
| 4,474,385 | 10/1984 | Costello et al. | 280/304.1 X |
| 4,486,048 | 12/1984 | Meyer | 297/435 X |
| 4,592,562 | 6/1986 | Strautnieks et al. | 280/250.1 |
| 4,593,929 | 6/1986 | Williams | 280/304.1 X |
| 4,643,446 | 2/1987 | Murphy et al. | 280/250.1 X |
| 4,722,572 | 2/1988 | Sata | 297/433 |
| 4,741,547 | 5/1988 | Tholkes | 297/DIG. 4 X |
| 4,759,561 | 7/1988 | Janssen | 280/250.1 |
| 4,917,395 | 4/1990 | Gabriele | 280/250.1 |
| 4,993,736 | 2/1991 | Garman et al. | 280/304.1 |

OTHER PUBLICATIONS

Gunnell Inc. catalogue.

*Primary Examiner*—David M. Mitchell
*Assistant Examiner*—Kevin Hurley
*Attorney, Agent, or Firm*—Learman & McCulloch

[57] ABSTRACT

A footrest assembly removably and pivotally connected to a wheelchair seat frame has a foot support rockable about two mutually normal axes to enable the elevation of the foot support to be adjusted and the foot support to swing between a normal position forwardly of the seat to an adjusted position to one side of the seat and facilitate movements of a person to and from the seat. The footrest also is bodily removable from the wheelchair seat frame.

21 Claims, 3 Drawing Sheets

FIG-1
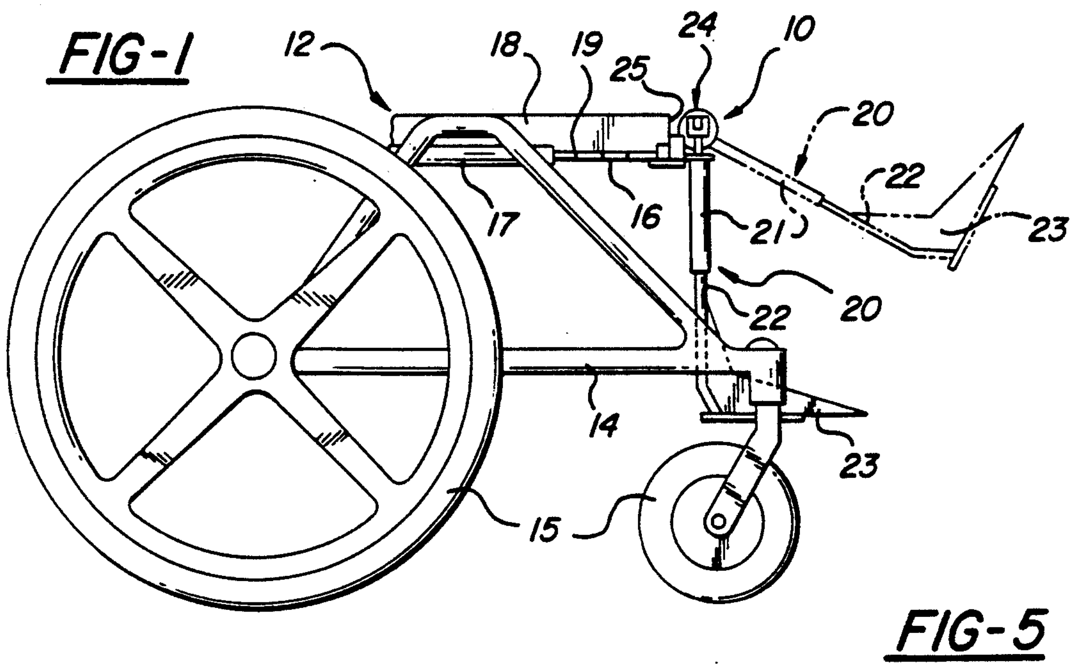
FIG-3
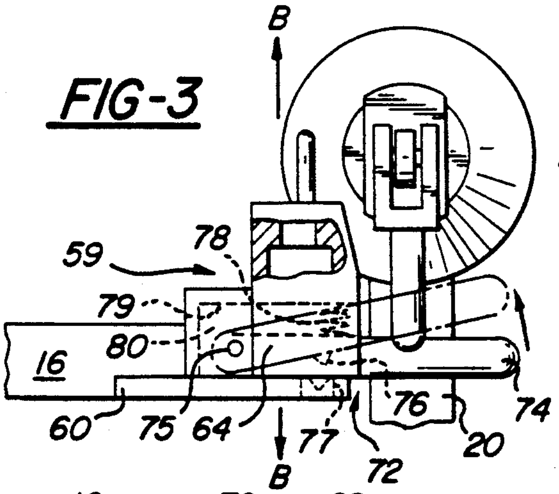
FIG-5
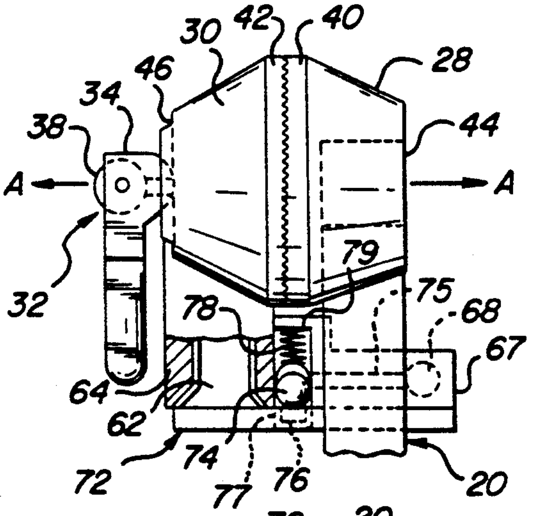
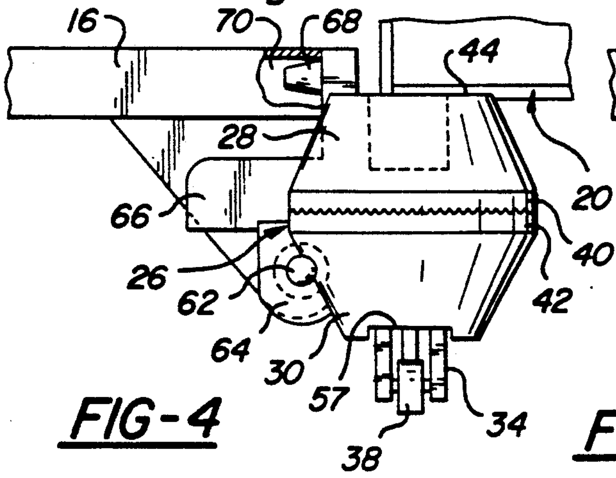
FIG-4
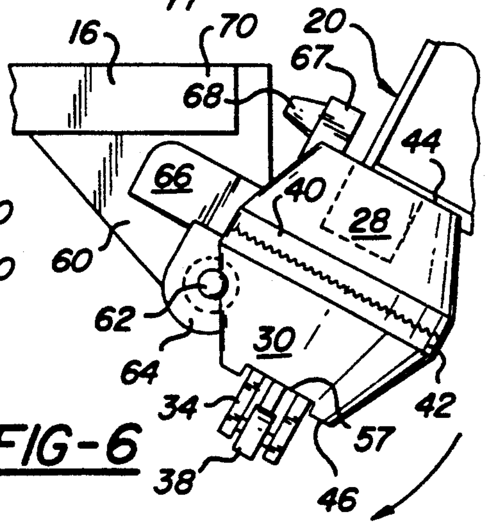
FIG-6

FIG-7
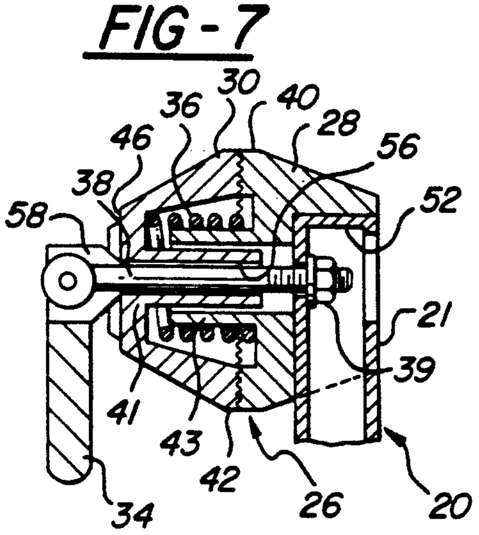
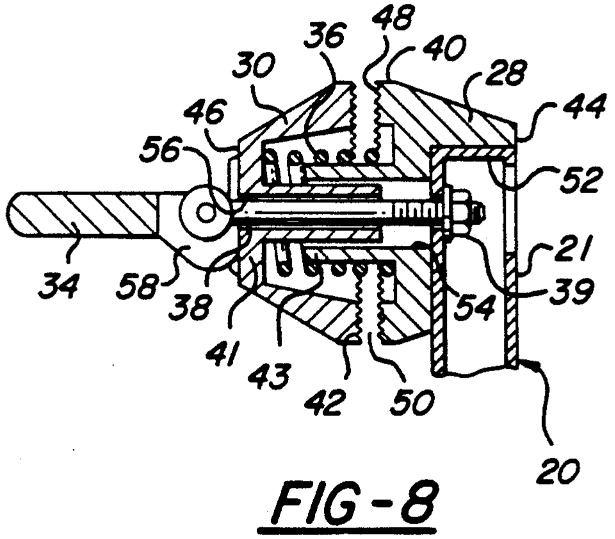
FIG-8
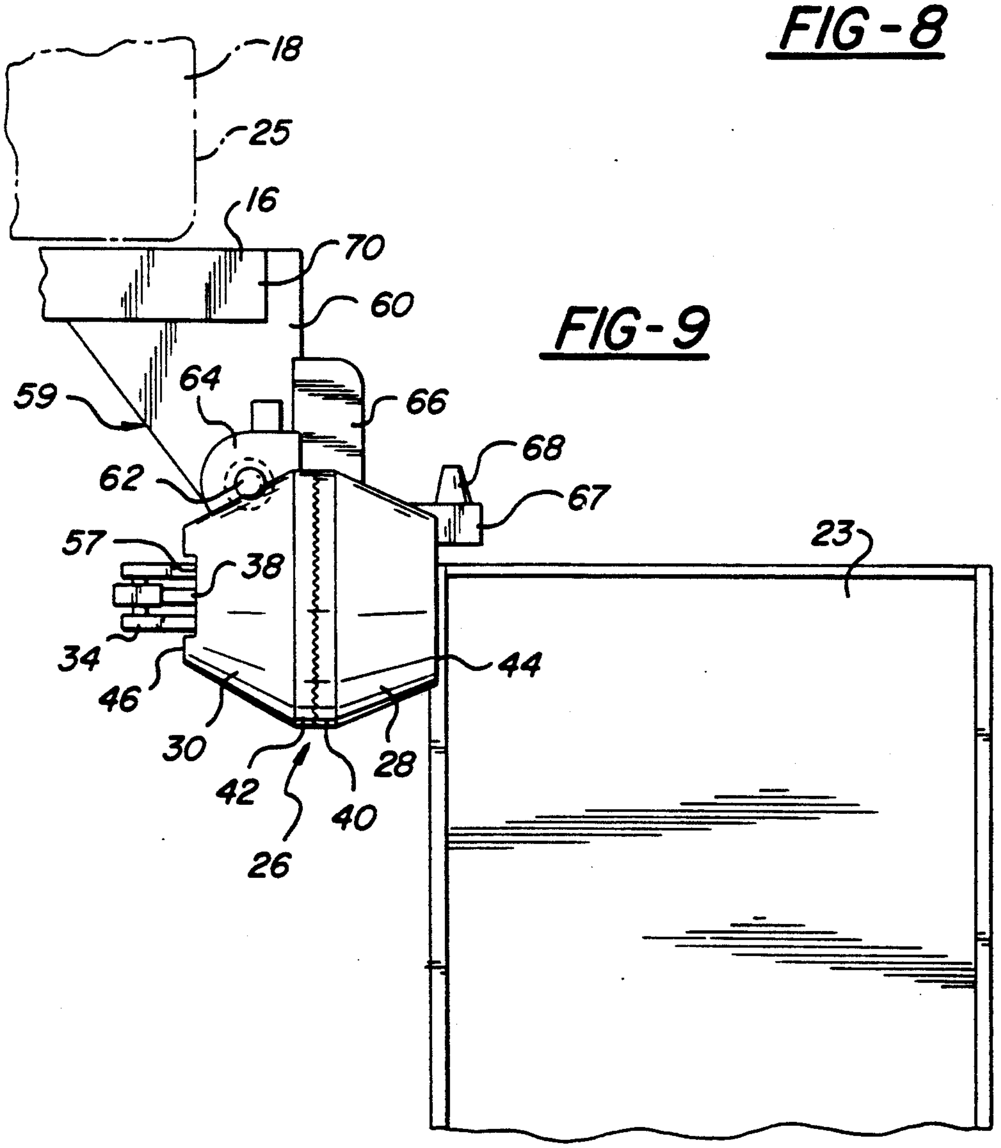
FIG-9

WHEELCHAIR FOOTREST ASSEMBLY

The invention relates to a footrest assembly for a wheelchair and more particularly to such an assembly which enables a footrest to be adjusted in two mutually normal planes.

BACKGROUND OF THE INVENTION

A conventional wheelchair has a main frame equipped with front and rear wheels and a body support composed of a seat member, a back member, and two footrest members. It is conventional to provide for vertical adjustment of each footrest member so as to enable persons of different height to use the same chair comfortably. It also is conventional to provide for tilting of the footrest member with respect to the seat member to change the elevation of the footrest, but it often is difficult to do so.

Entering and leaving a wheelchair may be difficult when the footrests remain in the normal position of use, i.e., in front of the seat. It is desirable, therefore, to be able to adjust the footrests to facilitate a person's entering and leaving the wheelchair. This desirable characteristic of wheelchair footrests has been recognized heretofore and some wheelchairs have provided individual foot supports which are rotatable about a substantially horizontal axis near the floor to enable the supports to be swung out of the way when a patient is getting into and out of a wheelchair. One such construction is illustrated in U.S. Pat. No. 3,023,048 issued Feb. 27, 1962, wherein the wheelchair includes footrest mounting bars fixed to the main frame of the wheelchair and has foot supports pivotally connected to the frame for rocking movements between a horizontal foot supporting position and a vertical position, thereby facilitating a person's entering and leaving the wheelchair. A problem with this assembly is that the supporting bars still may create difficulties for the chair's occupant. Furthermore, rotation of the foot supports can be difficult for an incapacitated person seated in the chair, particularly if the incapacity affects the ability to bend the distance required to enable the foot supports to be pivoted. In addition, the foot supports of this kind of construction are cantilevered from the pivotal axis, with the frequent result that the foot supports do not occupy a horizontal plane when in use, but have their free ends inclined toward the floor.

A principal objective of the invention is to provide a footrest assembly for a wheelchair which overcomes the disadvantages referred to above.

SUMMARY OF THE INVENTION

A footrest assembly constructed in accordance with the preferred embodiment of the invention is especially adapted for use with an incapacitated person's chair. The chair includes a main supporting frame on which is mounted a seat frame. A pair of footrest supports is operatively connected to the seat frame and each is equipped with a footrest. A compound pivot construction interconnects the seat frame and each footrest support and enables the footrest support to pivot about two substantially normal axes with respect to the frame. Pivotal movement of the footrest support about one axis adjusts the elevation of the footrest, whereas pivotal movement of such support about the other axis moves the footrest away from the front of the seat to provide the user clearance to exit and enter the chair.

The compound pivot construction includes a clamp which normally secures each footrest support in a selected position of elevation. Operating means is provided to release the clamp when desired and allow the footrest to move to an adjusted elevation. The compound pivot construction also includes a latch which prevents inadvertent pivotal movement of the footrest in a direction away from the front of the seat. The compound pivot construction also is capable of bodily separation from the chair seat frame, thereby enabling removal of the footrest from the main frame. Means is provided to prevent the inadvertent removal of the footrest from the chair.

BRIEF DESCRIPTION OF THE DRAWINGS

The preferred embodiment of the invention is illustrated in the accompanying drawings wherein:

FIG. 1 is a fragmentary elevational view of a portion of the chair and footrest;

FIG. 3 is an enlarged, side elevational view, partly in section, of a portion of the structure as viewed in the direction of the arrows 3—3 in FIG. 2;

FIG. 4 is a top plan view of the apparatus shown in FIG. 3;

FIG. 5 is an enlarged, front elevational view, partly in section, of the apparatus shown in FIG. 3;

FIG. 6 is a view similar to FIG. 4, but with parts of the apparatus in adjusted positions;

FIG. 7 is a view like FIG. 5, but with the parts shown in section;

FIG. 8 is a cross-sectional view like FIG. 7 but with the parts shown in adjusted positions; and FIG. 9 is a view similar to FIG. 6 but with the parts in fully adjusted positions.

THE PREFERRED EMBODIMENT

Figure 2:
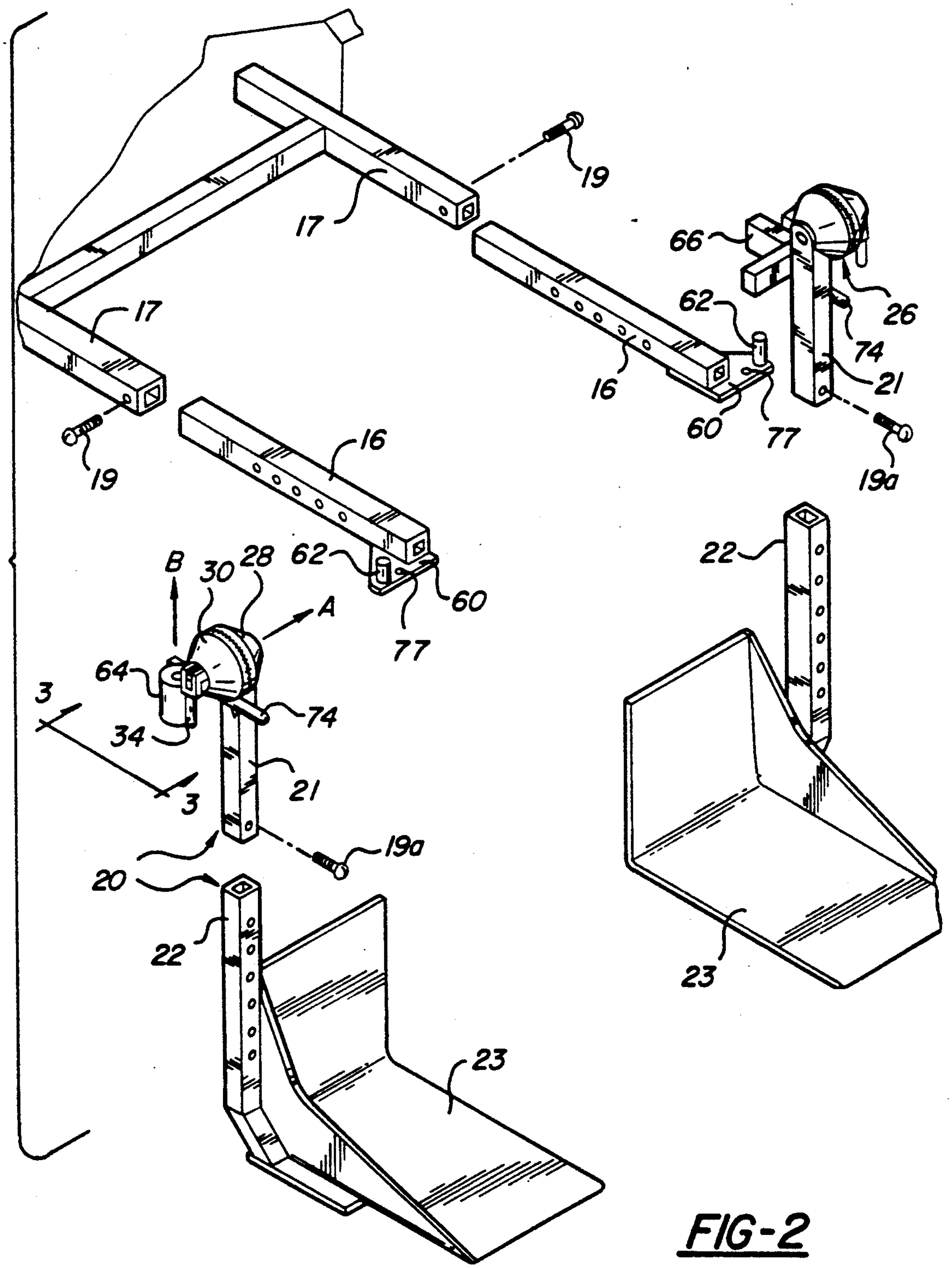
FIG. 2 is an exploded, isometric view of the principal components of the footrest assembly.

A footrest assembly constructed in accordance with the preferred embodiment of the invention is designated at 10 in FIG. 1 and is adapted to be used with an incapacitated person's wheeled chair 12. Generally, an incapacitated person's chair 12 includes a main frame 14 having wheels 15 and forwardly extending seat support frame bars 16 connected to the frame 14 to support a seat 18. The seat support frame bars 16 are slideably retained within tubes 17 and secured by a fastener 19 at selected positions of adjustment depending on the length of the user's thighs, as is common.

The footrest assembly 10 includes a pair of arms 20 each of which has an upper end 21 and a lower end adapted to receive a rod 22 fixed to a foot support 23. The seat support frame bars 16 and the footrest arms 20 are made of hollow, rectangular metal tubing, as is conventional. The footrest support rods 22 are hollow for reception in the arms 20 and may be secured thereto by a second fastener 19*a* at a selected adjusted position. This adjustment also facilitates adjustment of the chair to accommodate different height persons.

The footrest assembly 10 includes a pair of compound pivot structures 24 for connecting the foot supports to the chair seat frame and for pivoting the foot supports with respect to the frame. Each pivot structure 24 enables the associated footrest arm 20 to pivot about a substantially horizontal pivot axis A (FIGS. 2 and 5) to adjust the elevation of the foot support 23. Each footrest arm 20 also is pivotable about a substantially vertical axis B (FIGS. 2 and 3) for moving the foot support 23 laterally away from the front 25 (FIGS. 1 and 9) of the seat 18 as is shown in FIGS. 6 and 9.

Each pivot structure 24 includes a housing 26 having a first part or cup 28 fixed to the footrest arm 20 and a second part or cup 30 operatively connected to the frame via the adjacent seat support frame bar 16. Clamp means 32 interconnects the first and second cups 28, 30 for movements between a released position in which the second cup 30 may rotate with respect to the first cup 28 and a clamped position in which the second cup 30 is fixed to the first cup 28 at a selected position of adjustment. In other words, the first cup 28 and the second cup 30 of the housing may be rotated with respect to one another, whereas the clamp means 32 is operable to clamp the cups 28, 30 together at any selected position of pivotal adjustment thereof. Rotation of the housing cups 28 and 30 effects rocking movements of the foot supports 23 about the horizontal axis A and adjustment of the elevation of such foot supports.

The clamp means 32 comprises an operating lever 34 for clamping and unclamping the housing cups. A spring 36 reacts between the cups 28, 30 to bias them apart. A pin 38 extends through the spring 36 and both cups 28 and 30 and is pivoted at one end to the lever 34. The opposite end of the pin is threaded and fitted with a nut 39. The pin 38 is operable to draw the first cup 28 toward the second cup 30 against the force of the spring 36 to a clamped position.

The first and second housing cups of each pivot structure are frustoconical in shape and have larger diameter surfaces 40, 42 and smaller diameter surfaces 44, 46. The larger diameter surfaces 40, 42 confront one another and are provided with interengagable teeth 48, 50 cooperable with one another in the clamped position to prevent relative pivotal movement between the cups 28, 30. The smaller diameter surface 44 of the first housing cup 28 includes a rectangular notch 52 for receiving the end 21 of the associated footrest arm 20. The pin 38 extends not only through the first cup 28 but also into the footrest arm 20 thereby coupling the latter to the cup 28 for rotation therewith. The pin 38 extends through apertures 54, 56 in the first and second cups 28 and 30, respectively. The second cup 30 has a slot 57 at its smaller diameter end in which a cam lobe 58 carried by the lever 34 is accommodated.

The second cup 30 is generally hollow and has a bearing sleeve 41 therein providing the aperture 56 for the pin 38. The first cup 28 has a hollow bearing tube 43 extending from the enlarged diameter surface 40 adjacent and outside the sleeve 41. The spring 36 is accommodated within the two cups 28, 30 adjacent the hollow tube 43.

Each pivot structure 24 also includes rotary mounting means 59 for pivoting the associated footrest arm 20 about the vertical pivot axis B. The rotary mounting means 59 includes a base plate 60 which is fixed to the adjacent seat support frame bar 16 and is parallel to the plane of the seat 18. A pivot pin or spindle 62 is fixed to the plate 60 and extends vertically upwardly therefrom. A sleeve member or socket 64 fixed to the second cup 30 rotatably and separably receives the pivot pin 62. The footrest arm 20 is coupled by the pivot assembly 24 and the plate 60 to the seat support frame bar 16. The footrest arm 20 thus is pivotable about the pivot pin 62 from a first position in which the associated foot support 23 projects forwardly of the seat 18 to a second position in which the foot support extends laterally to one side of the seat 18.

The rotary mounting means 59 includes a guide bar 66 extending rearwardly from the sleeve member 64 toward and alongside the seat support frame bar 16. The guide bar 66 limits pivotal movement of the associated footrest arm 20 in a direction toward the centerline of the wheelchair. Fixed to the guide bar 66 and projecting laterally therefrom is a finger 67 on which is secured a keeper 68 that is adapted to project into the opening formed by the hollow end 70 of the adjacent seat support frame bar 16 when the associated foot support 23 is in its normal position directly forward of the seat 18. When the foot support is pivoted about the vertical axis B to a position to one side of the seat, as is shown in FIGS. 6 and 9, the keeper 68 will be withdrawn from the end of the support frame bar 16, thereby enabling bodily removal of the associated footrest assembly from the wheelchair simply by lifting the footrest support 20 upwardly to remove the sleeve 64 from the pivot pin 62.

Latching means 72 is provided for releasably latching each foot support 23 in the normal position in which it extends forwardly of the wheelchair. The latching means 72 (best shown in FIGS. 3 and 5) comprises a lever 74 pivoted at 75 to the guide bar 66. A latch pin 76 extends from the lever 74 for reception in an opening 77 in the plate 60. A spring 78 reacts between the lever 74 and the upper wall 79 of a recess 80 in which the lever is accommodated. The spring seats the latch pin 76 in the opening 77 when the foot support is in its normal position forward of the seat 18 to avoid inadvertent pivoting of the footrest away from such normal position. However, upon upward rocking of the lever 74 the pin 76 is withdrawn from the opening 77 thereby allowing free movement of the footrest.

FIGS. 1, 3, 4, and 7 illustrate each pivot structure 24 and the associated foot support 23 in the positions they occupy when a person occupies the wheelchair with his feet supported. In order to adjust the elevation of the foot support 23 for user comfort, the cam lever 34 is moved from the clamped position shown in FIG. 7 to the released position shown in FIG. 8 to enable the spring 36 to separate the cups 28 and 30 and disengage the confronting teeth 48 and 50, thereby enabling pivotal movement of the associated footrest arm 20 to adjust the elevation of the foot support as desired. Upon reaching the desired position, the cam lever 34 is returned to the clamped position illustrated in FIG. 7 thereby enabling the spring 36 to seat the cups 28 and 30 on each other with the teeth 48, 50 in mesh. Since the operating parts for the elevation adjustment of the foot supports are adjacent the forward edge of the seat, the occupant can make the adjustment himself in many instances without having to bend over or stretch.

To simplify the ingress and egress of a person to and from the chair each foot support 23 may be rotated about its vertical axis B from a position forwardly of the seat 18 to a laterally adjusted position as is indicated in FIG. 9. This is accomplished by upward rocking of the lever 74 to remove the pin 76 from the opening 77, thereby enabling the support footrest to pivot about the axis B and swing the support 23 to one side of the seat 18. The foot supports 23 and their associated parts then will occupy positions in which they do not interfere with a person's movements to or from a seated position in the chair.

If it is desired to remove either foot support 23 from the chair, such support is rocked about the axis B to a position in which the keeper 68 is withdrawn from the end 70 of the seat support frame bar 16, as is shown in FIGS. 6 and 9. The entire footrest assembly then may be separated from the chair by lifting the pivot structure 24 off the pivot pin 62.

Each footrest may be reassembled with the chair by returning the pivot assembly 24 to the associated pivot pin 62, following which the footrest may be swung toward the normal position of use. This movement causes the keeper 68 to reenter the forward end 70 of the seat frame bar 16, thereby precluding vertical movement of the pivot assembly 24 and separation of the footrest from the chair.

The disclosed embodiment is representative of a preferred form of the invention, but is intended to be illustrative rather than definitive thereof. The invention is defined in the claims.

We claim:

1. Apparatus for mounting a footrest on an incapacitated person's support having a main frame and a seat frame movably mounted on said main frame, said apparatus comprising a footrest; a compound pivot structure; first coupling means coupling said footrest to said structure for pivotal adjustments of said footrest relative to said seat frame about a first axis; and second coupling means coupling said footrest to said seat frame for conjoint movement therewith and for pivotal movements of said footrest relative to said seat frame about a second axis substantially normal to said first axis.

2. Apparatus according to claim 1 wherein said first axis is substantially horizontal and said second axis is substantially vertical.

3. Apparatus according to claim 1 wherein at least one of said coupling means is separable enabling removal of said footrest from said seat frame.

4. Apparatus according to claim 3 including releasable keeper means for preventing inadvertent removal of said footrest from said seat frame.

5. Apparatus according to claim 1 including releasable clamp means carried by said structure for selectively enabling and disabling said pivotal adjustments of said footrest.

6. Apparatus according to claim 5 wherein said clamp means comprises a pair of relatively rotatable members having confronting interengageable means; and means for moving said relatively rotatable members toward and away from one another between positions in which said interengagable means respectively are engaged with and disengaged from each other.

7. Apparatus according to claim 6 including spring means biasing said relatively rotatable members in directions away from one another.

8. Apparatus according to claim 7 including cam means for overcoming the bias of said spring means.

9. Apparatus according to claim 1 including releasable latch means for selectively enabling and disabling said pivotal movements of said footrest.

10. An incapacitated person's chair comprising a main frame; a seat frame movably mounted on said main frame; a footrest; and means mounting said footrest on said seat frame for conjoint movement therewith and for movement relative to said seat frame between a first position in which said footrest extends forwardly of said seat frame and a second position in which said footrest extends laterally of said seat frame, said mounting means also mounting said footrest on said seat frame for adjustments about a substantially horizontal axis.

11. A chair according to claim 10 wherein said mounting means comprises coupling means pivotally connecting said footrest to said seat frame for movements between said positions about a substantially vertical axis.

12. A chair according to claim 10 including releasable latch means for selectively enabling and disabling said movement of said footrest.

13. A chair according to claim 10 wherein said mounting means is separable from said seat frame thereby enabling said footrest to be disconnected from said seat frame.

14. A wheeled chair having a main frame; a seat frame movably mounted on said seat frame; a footrest; a pivot structure comprising first and second members rotatable about a substantially horizontal axis; means coupling said footrest to one of said members for enabling said footrest to occupy a first position forwardly of said seat frame and have its elevation adjusted; means for releasably clamping said members in a selected position of rotary adjustment; means rotatably coupling the other of said members to said seat frame for rotation about a substantially vertical axis to enable said footrest to be rocked laterally from said first position to a second position at one side of said seat frame; and separable latch means reacting between said other member and said seat frame for selectively enabling and preventing movement of said footrest from said first position to said second position, the coupling of said other of said members to said seat frame enabling said footrest to move conjointly with and relative to said seat frame.

15. A wheeled chair according to claim 14 wherein said other of said members is separable from said seat frame, and keeper means reacting between said other member and said seat frame for disabling separation of said other of said members from said seat frame which said footrest is in said first position.

16. An incapacitated person's chair comprising a frame; a footrest having opposite ends; mounting means carried by said frame; separable coupling means separably coupling one end of said footrest to said mounting means for rocking movements of said footrest about substantially vertical and horizontal axes for respectively enabling said footrest to move between a first position in which said footrest projects forwardly of said frame and a second position in which said footrest projects to one side of said frame and the other end of said footrest to be moved between vertically adjusted positions; releasable clamp means acting on said coupling means for maintaining said other end of said footrest in a selected position of vertical adjustment; latch means reacting between said coupling means and said frame for selectively enabling and disabling rocking movements of said footrest about said substantially vertical axis; and releasable keeper means reacting between said coupling means and said frame for disabling separation of said coupling means and said footrest from said frame when said footrest is in said first position.

17. A chair according to claim 16 wherein said frame comprises a seat frame carried by a main frame.

18. A chair according to claim 16 wherein said coupling means comprises a pair of conical members having larger and smaller ends; the larger ends of said members confronting one another and having teeth engageable with one another; means biasing the larger ends of said conical members toward one another to effect engagement of said teeth; and means for overcoming the bias of said biasing mans to effect disengagement of said teeth and enable relative rotation of said conical members about said substantially horizontal axis.

19. A chair according to claim 16 wherein said keeper means comprises a projection carried by said coupling means and movable into and out of an opening in said frame in response to movement of said footrest about said substantially vertical axis.

20. A chair according to claim 16 wherein said mounting means comprises a spindle and a socket rotatably accommodating said spindle.

21. An incapacitated person's chair comprising a main frame; a seat frame carried by said main frame; a footrest; means mounting said footrest on said seat frame for movement between a first position in which said footrest extends forwardly of said seat frame and a second position in which said footrest extends laterally of said seat frame; and releasable keeper means for preventing inadvertent disconnection of said footrest from said seat frame.

* * * * *